Figure 1:
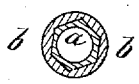
Figure 2:
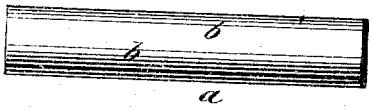

E. S. JOHNSON.

Ornamented Pencil-Cases.

No. 5,469. Reissued July 1, 1873.

*Witnesses*

E. S. Johnson Jr.

P. C. Noble

*Inventor*

E. S. Johnson per C. Rogers

Atty

UNITED STATES PATENT OFFICE.

EPHRAIM S. JOHNSON, OF JERSEY CITY, NEW JERSEY.

IMPROVEMENT IN ORNAMENTED PENCIL-CASES.

Specification forming part of Letters Patent No. 121,627, dated December 5, 1871; reissue No. 5,134, dated November 5, 1872; reissue No. 5,469, dated July 1, 1873; application filed March 25, 1873.

*To all whom it may concern:*

Be it known that I, EPHRAIM S. JOHNSON, of Jersey City, in the county of Hudson and State of New Jersey, have invented new and useful Improvements in Ornamenting Pen and Pencil Cases; and I do hereby declare that the following is a full, clear, and exact description thereof, reference being had to the accompanying drawings and to the letters of reference marked thereon making a part of this specification.

My invention has for its object an improvement in ornamenting pen and pencil cases in a cheap, simple, and durable manner. My invention consists in providing a tube of the proper length and diameter for the barrel of a pen or pencil, upon which I secure the material designed for the ornamenting or finishing surface when the case is completed.

By experience I have found that strips, bars, or slabs of the mother-of-pearl secured to the cylinder in longitudinal sections when polished produces a highly ornamental and pleasing surface. The pleasing effect to the eye is increased by alternating these sections with different colors of the mother-of-pearl.

Previous to my invention the only method of ornamenting these goods was to engrave the barrel or cylinder of the pen or pencil, either by molding or by the hand-graver. By my invention a higher degree of ornamentation is obtained.

To enable others skilled in the art to make and use my invention, I will proceed to describe its construction.

Figure I is a transverse vertical sectional elevation, showing the ends of the pearls or ornamenting materials, and the shape in which they are made when secured to the tube. Fig. II is a side elevation of my invention.

Letters of like name and kind indicate like parts in each of the figures.

*a* represents a cylinder or tube, made of any of the well-known metals, hard rubber, or any other suitable material, and of proper dimensions to form the barrel of a pen or pencil case, upon the surface of which strips or slabs of the mother-of-pearl or other ornamenting materials are rigidly secured by any well-known means.

From experience it has been found a mechanical convenience to make the cylinder or tube *a* prismatic in form, and in section polygonal, as it is much easier to fit and secure the slabs of pearl to the flat surface of a prism than to a cylinder.

The tube *a* may be composed of any number of sides desired, and upon each of the sides a strip or slab of the mother-of-pearl or other ornamenting material is applied, and caused to adhere thereto by means of shellac or other material suitable for the purpose. The surface of the pearl or all of the ornamenting materials that form the outer surface of the body of the pencil is then finished in any well-known manner, which presents a pleasing and attractive appearance to the eye.

Having thus described my invention, what I claim as new, and desire to secure by Letters Patent of the United States, is—

A pencil-case ornamented with longitudinal slabs of mother-of-pearl or other ornamental material secured to the surface of a metallic tube, *a*, as herein shown and described.

EPHRAIM S. JOHNSON.

Witnesses:
C. ROGERS,
E. S. JOHNSON, Jr.